INVENTORS
MARCEL DELASSUS
MICHEL BRIEC
BERTRAND LAZARD

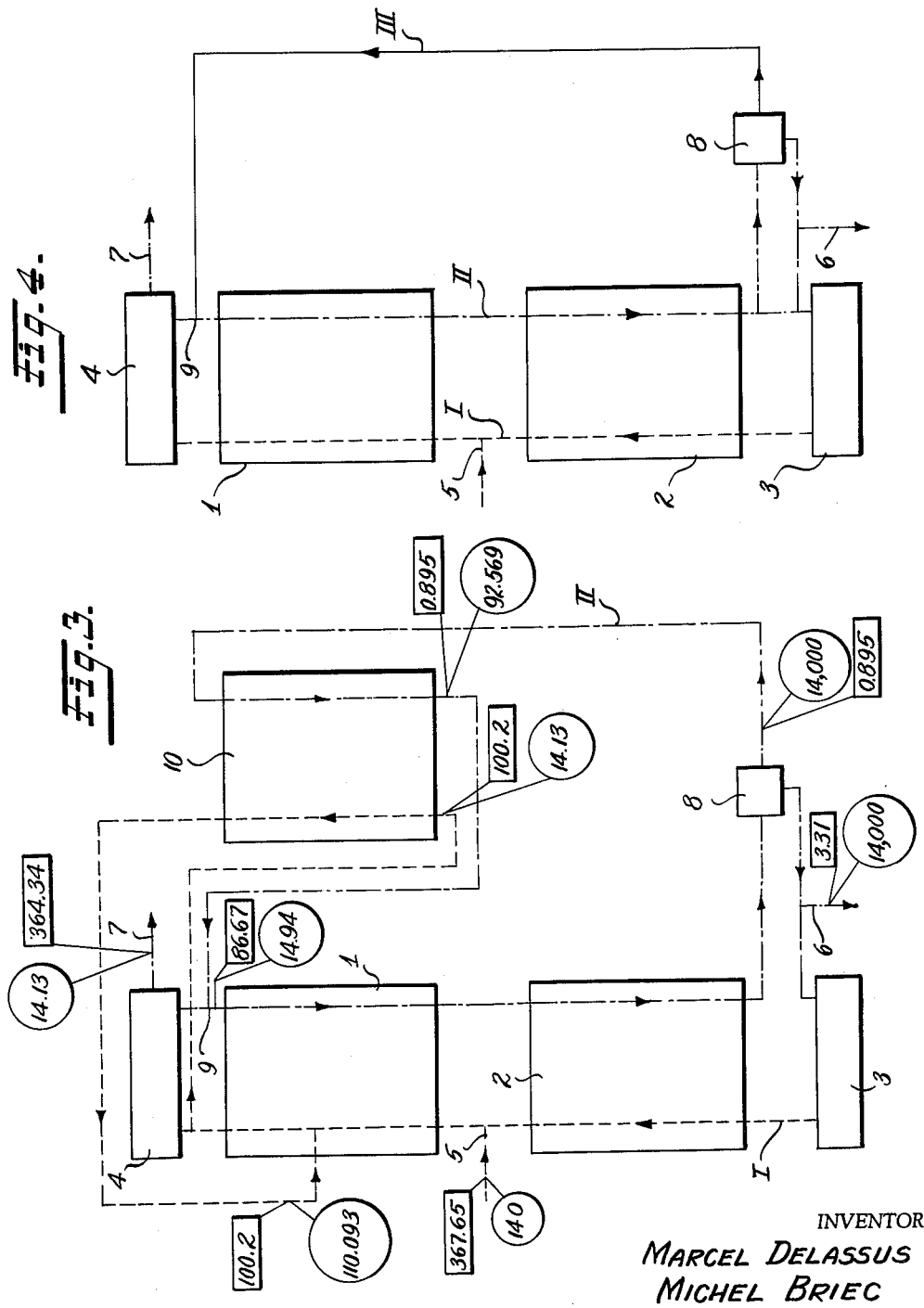

Feb. 8, 1966   M. DELASSUS ETAL   3,233,971
PROCESS FOR ENRICHING AMMONIA IN DEUTERIUM
Filed June 6, 1960   4 Sheets-Sheet 3

INVENTORS
MARCEL DELASSUS
MICHEL BRIEC
BERTRAND LAZARD
BY
ATTORNEYS

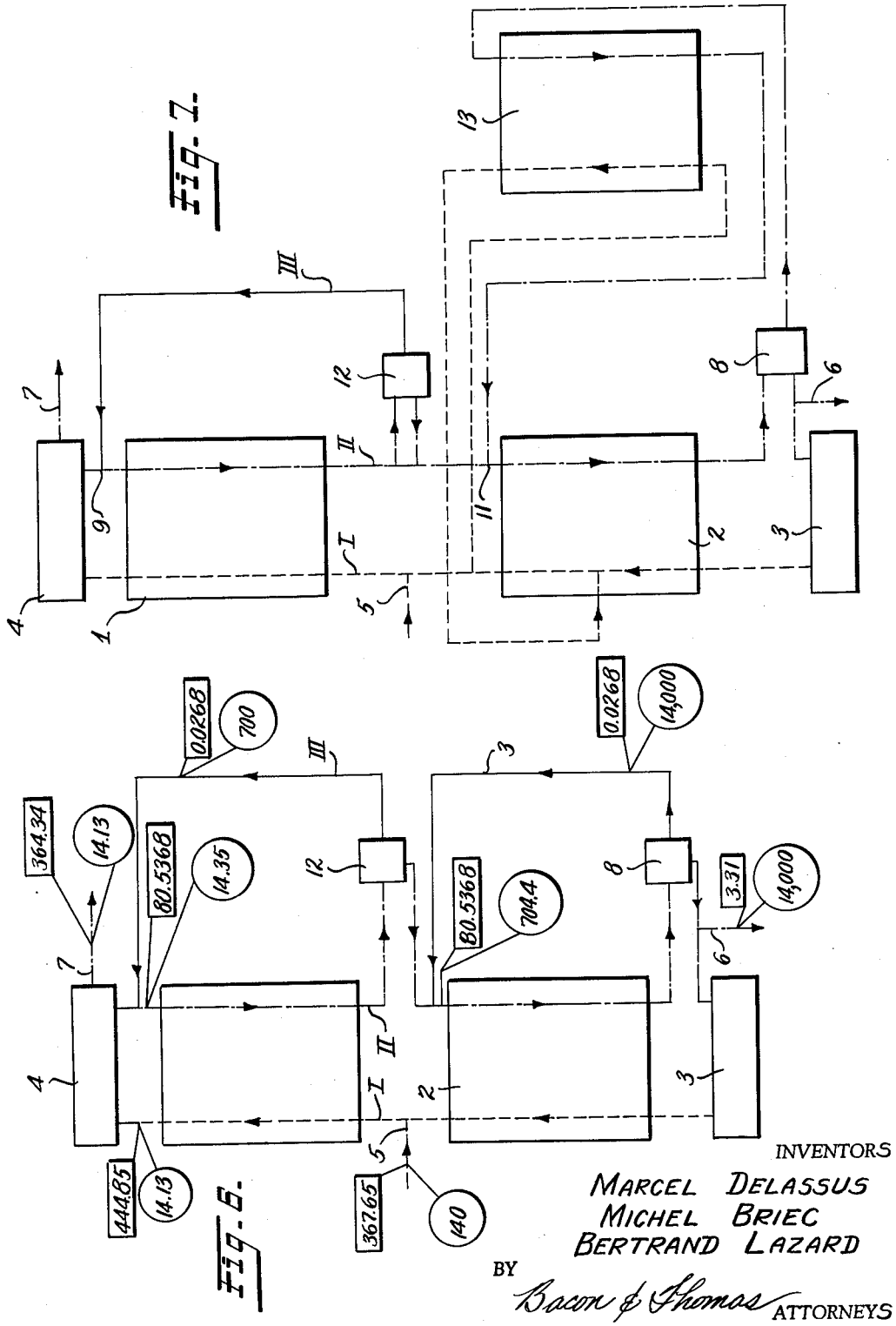

United States Patent Office 3,233,971
Patented Feb. 8, 1966

3,233,971
PROCESS FOR ENRICHING AMMONIA IN DEUTERIUM
Marcel Delassus, Mazingarbe, Michel Briec, Fresnes, and Bertrand Lazard, Paris, France, assignors to Commissariat à l'Energie Atomique, Paris, France
Filed June 6, 1960, Ser. No. 34,268
Claims priority, application France, June 8, 1959, 796,860
3 Claims. (Cl. 23—193)

The present invention is concerned with a process for the preparation of heavy water and more particularly with a process involving monothermic isotopic ammonia-hydrogen exchange.

The preparation of heavy water by isotopic monothermic ammonia-hydrogen exchange is a known method. The advantage of this process resides in its simplicity but it has many drawbacks.

Thus, in order that this reaction may proceed, at an appreciable speed, it is necessary to add in the liquid phase a soluble catalyst, such as potassamide, caesium amide or rubidium amide. If this exchange is effected in at least one exchange reactor or in an assembly of exchange reactors in which the ammonia does not run in a closed cycle, it will be necessary to recover the dissolved catalyst in order to re-inject it into the supplied ammonia.

In addition to the problem of recovering the catalyst, a second problem arises due to the fact that the molecule of soluble catalyst contains hydrogen, the isotope of which is to be obtained, and its deuterium concentration will thus vary at the same time as that of the ammonia. The recycling of the catalyst may then lead to a mixture of two substances having deuterium concentrations which are such as to cause disadvantageous consequences for the characteristics of the isotopic exchange installation, and more particularly, with respect to the deuterium yield.

For a better understanding of the present invention, reference will be made to the accompanying drawings in which:

FIGURES 1 and 2 represent, diagrammatically known types of isotopic monothermic exchange installations, and
FIGURES 3 to 7 represent installations according to the present invention.

The exchange installation shown in FIGURE 1 comprises two exchange reactors or exchange reactor assemblies 1 and 2, an apparatus 3 for converting the ammonia into a gas mixture containing hydrogen and nitrogen in a molar ratio of 3:1 which mixture serves as a gaseous reflux for the reactor 2 and a unit 4 for synthesizing ammonia which, when liquified, supplies the liquid reflux at the top of the reactor 1. This installation is supplied at 5 with the gas for the ammonia synthesis, the product being drawn off at 6 in the form of ammonia enriched in deuterium and the rejection of ammonia poor in deuterium being effected at 7. In this figure as well as in the following figures, the circuit I represents the circuit of the gas used for the synthesis of ammonia while the circuit II represents that of the ammonia. Since the catalyst is dissolved in the liquid phase, it will be necessary to draw it off from the enriched liquid ammonia at the bottom of the reactor 2, in order to re-inject it in the ammonia poor in deuterium entering at the top of the reactor 1. This recuperation of the catalyst is effected (FIGURE 2) by means of an evaporator 8.

If:

$D$ denotes the output of the supply gas, calculated as hydrogen,
$x_f$ its deuterium concentration,
$D_p$ the output of deuterium enriched ammonia calculated as hydrogen, drawn off at the bottom of the reactor 2,
$x_p$ its deuterium concentration,
$D_w$ the output of ammonia poor in deuterium, calculated as hydrogen, leaving the ammonia synthesis unit 4,
$x_w$ its deuterium concentration,
$D_c$ the output of recycling of the enriched catalyst or of a mixture of liquid ammonia and enriched catalyst, calculated as hydrogen,
$x_r$ the deuterium concentration of the resulting liquid phase entering at the top of the reactor 2, one obtains at point 9:

$$D_c x_p + D_w x_w = (D_c + D_w) x_r$$

or $$x_r = \frac{D_c x_p + D_w x_w}{D_c + D_w} \quad (1)$$

The deuterium concentration of the gas leaving the reactor 1 also being $x_w$, it is necessary to have $x_r < \alpha x_w$, $\alpha$ being the separation factor of the ammonia-hydrogen exchange reaction, in order that the operation of the reactor 1 may be ensured. Taking into account the Equation 1, this is expressed by:

$$x_w > \frac{D_c x_p}{\alpha(D_w + D_c) - D_w} \quad (2)$$

Thus, the deuterium yield of the installation is $$\rho = \frac{D_p x_p}{D x_f}$$

The total balance of material from the installation shows that the output of rejection of ammonia poor in deuterium calculated as hydrogen, is $D - D_p$ and a total deuterium balance may be expressed by the equation:

$$D x_f = D_p x_p + (D - D_p) x_w$$

or $$\frac{D_p x_p}{D x_f} = 1 - \left(1 - \frac{D_p}{D}\right)\frac{x_w}{x_f}$$

Since $D_p$ is small relative to $D$, this may also be expressed by:

$$\frac{D_p X_p}{D x_f} = 1 = \frac{x_w}{x_f}$$

and hence $$\rho = 1 - \frac{x_w}{x_f} \quad (3)$$

Since the Equation 2 imposes a lower limit on $x_w$, $x_p$, $D_w$ and $D_c$ being fixed, the yield $\rho$ will have an upper limit, this limit being:

$$\rho = 1 - \frac{D_c \frac{x_p}{x_f}}{\alpha(D_w + D_c) - D_w}$$

This limit does not exist when there is no re-mixture since in that case, $D_c = 0$.

The present invention has for its object to provide an improved process for the preparation of heavy water by monothermic isotopic ammonia-hydrogen exchange which remedy these drawbacks.

The present invention consists in a process for enriching ammonia in deuterium by monothermic isotopic exchange, in at least one reactor, between liquid ammonia and hydrogen containing deuterium in the presence of a catalyst dissolved in the liquid ammonia and circulating in a cycle in said reactor, wherein, in order to reduce the concentration and/or the amount of deuterium recycled with the catalyst from a point of the cycle which is rich in deuterium to a point of the cycle which is poor in deuterium, at least one catalyst reinjection loop including an evaporator is associated with at least one reactor, in which loop the catalyst leaving a reactor is concentrated or dried before being re-injected into the ammonia of the reactor.

The invention also consists in a process for the deuterium enrichment of ammonia by monothermic isotopic exchange in at least two reactors between liquid ammonia and hydrogen containing deuterium, in the presence of a catalyst dissolved in the liquid ammonia and circulating in a cycle in the said reactors, wherein, in order to reduce the concentration and/or the quantity of deuterium recycled with the catalyst from a point in said cycle which is rich in deuterium to a point which is poor in deuterium, at least one catalyst re-injection loop is provided, said loop or each of said loops being associated with at least one of the reactors, and in a first fraction of the number of loops the catalyst leaving a first fraction of the number of reactors is dried before being re-injected into the ammonia at the head of said first fraction of the number of reactors, whilst in a second fraction of the number of loops the solution of the catalyst leaving a second fraction of the number of reactors is concentrated and this concentrated solution is passed in counter-current relative to a gaseous mixture for ammonia synthesis removed from the outlet of said second fraction of the number of reactors, said concentrated solution and said gaseous mixture then being re-injected into said second fraction of the number of reactors into the ammonia at the head of said second fraction of the number of reactors and into a similar deuterium concentration point, respectively.

In other words an installation for isotopic enrichment between liquid ammonia and hydrogen, in the presence of a catalyst dissolved in liquid ammonia and comprising $n$ reactors or assemblies of reactors, is also provided, in order to reduce the concentration and/or the quantity of deuterium recycled with the catalyst from the deuterium rich point to the deuterium poor point of the installation, with $m$ catalyst re-injection loops, each of these loops being associated with a fraction of the $n$ reactors or assemblies of reactors, and in $k$ of these loops the catalyst leaving a fraction of the $n$ reactors or assemblies of reactors is dried by evaporation before re-injecting it in the ammonia at the head of this fraction, and in $l$ of these loops the solution of catalyst in the ammonia leaving a fraction of the $n$ reactors or assemblies of reactors is concentrated by evaporation, then this concentrated solution is passed in an auxiliary exchanger counter-current to the gas mixture for the synthesis of ammonia removed from the outlet of this fraction, the concentrated solution of the catalyst and the ammonia synthesis gas being re-injected into this same fraction, into the ammonia at the head of this fraction and at a similar point of isotopic concentration respectively $k$, $l$, $m$ and $n$ being integers such that $k+l=m$ and $m \leq n$.

The reactors employed may be of various types, such as contact chambers of various forms; the assemblies of reactors may be constituted by exchange towers provided with plates or with a suitable filling or by an assembly of primary reactors in series. Thus, in an exchange tower provided with plates, each plate has the function of a primary reactor; in this case, each re-injection loop of the catalyst may be associated, not only with one or several exchange towers, but with a fraction of the total number of plates of a tower and in the extreme case, it is possible to associate a re-injection loop of the catalyst with each plate.

In the process according to the present invention, these catalysts may be used which have been used in the previously known process, such as potassamide, rubidium amide and caesium amide.

By reference to the accompanying schematic FIGURES 3 to 7, various installations for carrying out the process, according to the present invention will be described by way of example. The devices of the embodiments which will be described in relation to these examples are to be considered as being part of the invention, it being understood, however, that it will also be possible to use any equivalent arrangements without going beyond the scope of the invention.

FIGURE 3 is a diagram of an embodiment of the invention, according to which a re-injection loop of the catalyst comprising an evaporator concentrating the solution of the catalyst and an auxiliary exchanger is associated with two reactors, which gives the following values to the parameters: $k=0$; $l=1$, $m=1$, $n=2$.

FIGURE 4 shows a diagram of a second embodiment of the invention according to which a re-injection loop of the catalyst comprising an evaporator which dries the catalyst is associated with two reactors, which gives the following values to the parameters: $k=1$; $l=0$; $m=1$, $n=2$.

FIGURE 6 shows a diagram of a fourth embodiment of the invention, according to which two re-injection loops of the catalyst each comprising an evaporator for drying the catalyst, are associated with two reactors, which gives the following values to the parameters: $k=2$, $l=0$; $m=2$; $n=2$.

FIGURE 7 shows a diagram of a fifth embodiment of the invention, according to which two re-injection loops of the catalyst are associated with two reactors, the first loop comprising an evaporator concentrating the solution of the catalyst and an auxiliary exchanger and, the second loop comprising an evaporator for drying, the catalyst, the parameters being as follows: $k=1$; $l=1$; $m=2$; $n=2$.

Figure 1:
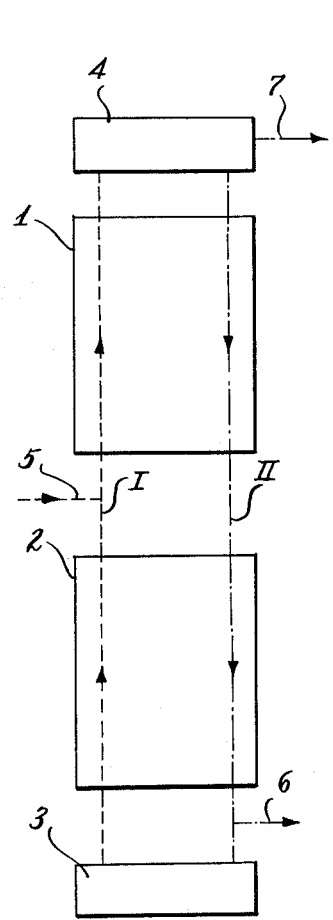
Figure 2:
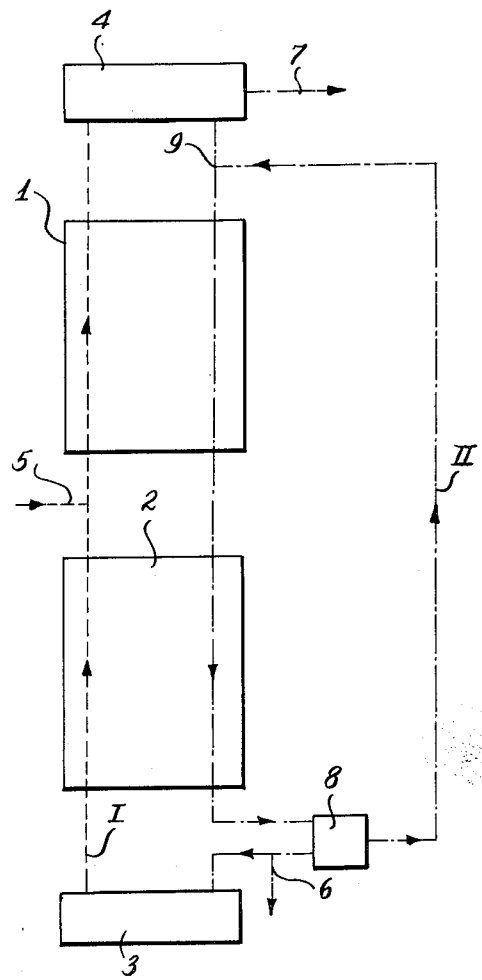

On these figures only the parts which are necessary to the understanding of the invention have been shown, corresponding parts of the different figures having identical references. More particularly, in order to simplify the diagrams, the means for circulating the liquid and the gases, the heat exchangers, the expanders, the compressors etc. have not been shown.

Referring to FIGURE 3, this shows two assemblies of reactors formed, in this case, by two main exchange towers 1 and 2, and apparatus 3 converting ammonia into a gaseous mixture of nitrogen and hydrogen, a synthesis unit 4, and inlet 5 for the gas mixture for the ammonia synthesis, an outlet 6 for deuterium-enriched ammonia, an outlet 7 for deuterium-poor ammonia, and a re-injection loop for the catalyst, associated with the two exchange towers 1 and 2, which comprises an evaporator 8 and an exchange tower 10. The point 9 represents the point of re-injection of this loop. The circuit I represents the circuit of the ammonia synthesis gas mixture, and the circuit II that of the liquid amomnia.

The operation of this installation is as follows: A fraction of the enriched ammonia from the bottom of the tower 2 is evaporated in evaporator 8. This fraction, from which the catalyst is removed, is passed to the converter 3, the non-evaporated ammonia and the catalyst which is now concentrated in it, are sent to a third tower, or an assembly of towers 10, where they are reduced in deuterium content by an exchange with the ammonia synthesis gas mixture which is poor in deuterium, drawn off at the top of the tower 1, before being re-injected at 9 in the deuterium-depleted ammonia entering into this tower. The ammonia synthesis gas mixture leaving the tower 10 is passed to a suitable point of the installation, such as the tower 1. Recycling of the catalyst is thus achieved and the drawback which would have resulted from the simple mixture of the two liquid phases at the top of the tower 1 is avoided.

FIGURE 3 also shows, in rectangles, the outputs expressed in kilogram molecules of hydrogen per hour and in circles, the atomic deuterium concentrations expressed in parts per million.

Thus, from an output of ammonia synthesis gas mixture, calculated as hydrogen, of 367.65 kilogram molecules per hour, of which the deuterium concentration is 140 parts per million, this installation supplies, at the outlet 6, an output of enriched ammonia, calculated as hydrogen, of 3.31 kilogram molecules per hour, the deuterium concentration of which amounts to 14,000 parts per million. The efficiency of the exchanger 10 is such that the concentration of deuterium in the re-injection loop decreases from 14,000 parts per million to 92.569 parts per million, which results in only a small quantity of deuterium being re-injected at 9 thereby causing the concentration of the deuterium in the ammonia entering in the tower 1 only to increase from 14.13 to 14.94 parts per million. The ammonia synthesis gas mixture, which at the inlet of the exchange tower 10 has a deuterium concentration of 14.13 parts per million, has, at its outlet, a deuterium concentration of 110.093 parts per million and is re-injected into the tower at a point having a similar concentration.

Referring to FIGURE 4, this shows, in addition to the parts which are common to the different figures which have been described above, an evaporator 8 which dries the catalyst and a circuit III of the dry catalyst.

The operation of this installation is as follows: The liquid phase is completely evaporated in the evaporator 8 and a completely dry catalyst is thus obtained. It is then possible to re-inject it at the top of tower 1, and thus avoid any mixture of deuterium-enriched ammonia with deuterium-poor ammonia supplied to the tower 1.

Figure 5:
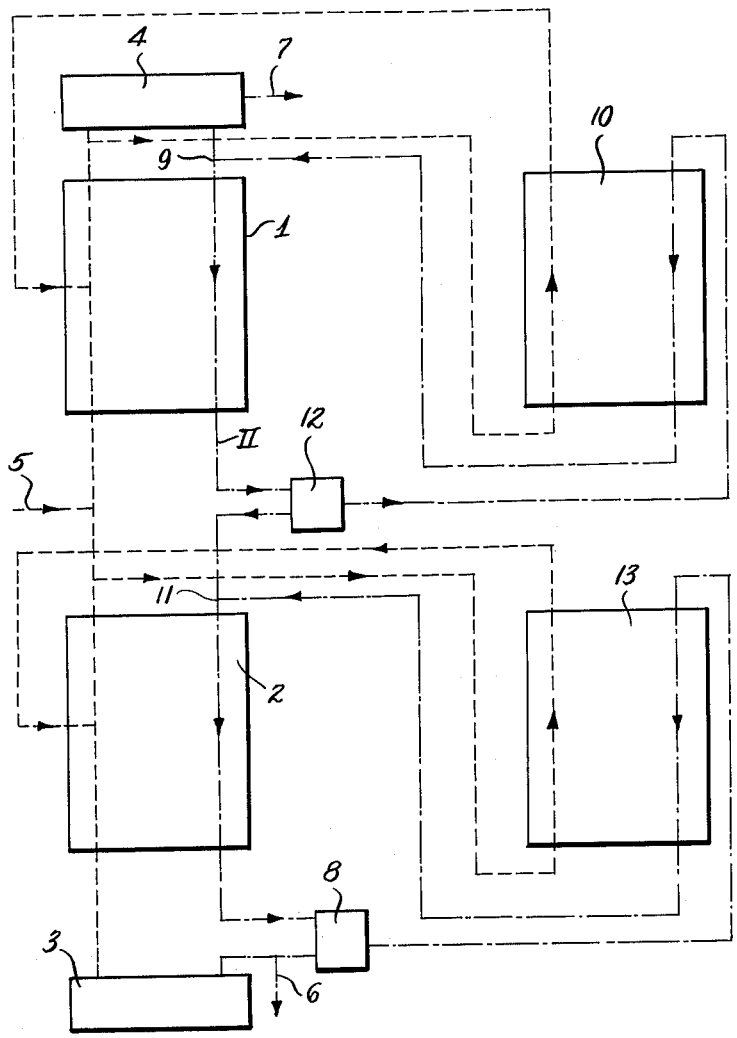
FIGURE 5 shows a diagram of a third embodiment of the invention according to which two re-injection loops of the catalyst, each of which comprises an evaporator concentrating the solution of the catalyst and an auxiliary exchanger, are associated with two reactors, which gives the following values to the parameters: $k=0$; $l=2$, $m=2$; $n=2$.

FIGURE 5 shows in addition to the elements which are common to the different figures which have been described above, two re-injection loops for the catalyst, one of which is associated with the main exchange tower 1 and comprises an evaporator 12 and an exchange tower 10 and the other of which is associated with the main exchange tower 2 and comprises an evaporator 8 and an exchange tower 13. The point 11 represents the point of re-injection of the loop associated with the main exchange tower 2.

The operation of this installation is as follows: A fraction of the enriched ammonia leaving the tower 1 is evaporated. This fraction, which is freed of its catalyst, is recondensed and passed to the top of the tower 2, the non-evaporated fraction and the catalyst which is now concentrated in it are sent to tower 10 where they are reduced in deuterium content by exchange with ammonia synthesis gas mixture which is poor in deuterium, which is drawn off at the top of the tower 1, before being re-injected at 9 into the deuterium-poor ammonia entering into this tower; the ammonia synthesis gas mixture leaving the tower 10 is passed to a suitable point of the installation, such as the tower 1.

Another fraction of the deuterium-enriched ammonia is evaporated at the bottom of the tower 2, this fraction which is freed of catalyst, being sent to the converter 3, the non-evaporated fraction in which the catalyst is now concentrated, is washed and reduced in deuterium content in a tower 13 by ammonia synthesis gas mixture which is poor in deuterium, drawn off at the top of the tower 2, before being re-injected at 11 into the ammonia which enters at the top of this tower. The ammonia synthesis gas mixture leaving the tower 13 is sent to a suitable point of the installation, such as the tower 2.

FIGURE 6 shows, in addition to the elements which are common to the different figures which have been described above, two catalyst re-injection loops, one of which is associated with the main exchange tower 1 and comprises the evaporator 12, and the other which is associated with the main exchange tower 2 and comprises the evaporator 8.

The operation of the installation is as follows: In the first loop, the ammonia leaving the tower 1 is completely evaporated in the evaporator 12 and, after being recondensed, is passed to the top of the tower 2; the dry catalyst leaving the evaporator 12 is re-injected at 9. In the second loop, the ammonia leaving the tower 2 is completely evaporated in the evaporator 8 and is passed to the apparatus 3; the dry catalyst leaving the evaporator 8 is re-injected at 11. This recycling in two loops avoids mixing the catalyst with the highest deuterium concentration with the ammonia poorest in deuterium; thus, the mixtures are made with constituents having substantially similar deuterium concentrations.

This figure also shows, in rectangles, the outputs expressed in kilogram molecules of hydrogen/hour and, in circles, the atomic deuterium concentrations expressed in parts per million.

Thus, from an output of ammonia synthesis gas mixture, calculated as hydrogen, of 367.65 kilogram molecules/hour the deuterium concentration of which amounts to 140 parts per million, this installation supplies, at the outlet 6, an output of deuterium-enriched ammonia, calculated as hydrogen of 3.31 kilogram molecules/hour, the deuterium concentration of which amounts to 14,000 parts per million. The advantage provided by the use of two catalyst re-injection loops appears clearly in this figure; the amount of deuterium re-injected at 9 only causes the concentration of the deuterium in the ammonia entering in the tower 1 to alter from 14.13 to 14.35 parts per million; similarly the amount of deuterium re-injected at 11 causes the concentration of deuterium in the ammonia entering in the tower 2 only to change from 700 to 704.4 parts per million.

FIGURE 7 shows, in addition to the elements which are common to the different figures which have been described above, two catalyst re-injection loops, one of which is associated with the main exchange tower 1 and comprises the evaporator 12 and the other of which is associated with the main exchange tower 2 and comprises the evaporator 8 and the exchange tower 13.

This embodiment represents one of the possible combinations of the preceding examples. Its operation is as follows: In the first loop, the ammonia leaving the tower 1, is completely evaporated in the evaporator 12 and after being recondensed, is passed to the top of the tower 2; the dry catalyst leaving the evaporator 12, is re-injected at 9. In the second loop, the ammonia leaving the tower 2 is partly evaporated and the evaporated fraction passed to the converter 3; the non-evaporated fraction in which the catalyst is concentrated, is reduced in deuterium content in the exchange tower 13 by exchange with the ammonia synthesis gas mixture drawn off at the top of the tower 2 and is re-injected at 11 into the ammonia supplying this tower; the ammonia synthesis gas mixture leaving the tower 13 is passed back into a suitable point of the installation, such as the tower 2.

We claim:
1. A process for enriching ammonia in deuterium, comprising flowing liquid ammonia of low deuterium content having an alkali metal amide catalyst dissolved therein along a path in contact with synthesis gas comprising hydrogen gas containing deuterium capable of being transferred to said liquid ammonia in the presence of said catalyst, whereby the liquid ammonia becomes enriched in deuterium in a terminal portion of said path; concentrating the solution of catalyst from liquid ammonia in the terminal portion of said path by evaporating a portion of the ammonia therefrom; flowing said concentrated solution in contact with synthesis gas comprising hydrogen gas of relatively low deuterium content from an initial portion of said contact path to reduce materially the deuterium content of said concentrated solution; injecting said solution of catalyst of reduced deuterium content into said liquid ammonia of low deuterium content entering said path and injecting said synthesis gas into said gas contact path at a point of similar deuterium concen- tration, whereby the amount of deuterium recycled with the catalyst is minimized.

2. A process for enriching ammonia in deuterium, comprising flowing liquid ammonia of low deuterium content having a first body of an alkali metal amide catalyst dissolved therein along a first path in contact with synthesis gas comprising hydrogen gas containing deuterium capable of being transferred to said liquid ammonia in the presence of said catalyst, whereby the liquid ammonia becomes enriched in deuterium in a terminal portion of said first path; evaporating a portion of said liquid ammonia from said terminal portion of said first path to form a concentrated solution of said first body of catalyst in liquid ammonia enriched in deuterium; flowing said concentrated solution in contact with synthesis gas comprising hydrogen gas of relatively low deuterium content from an initial portion of said first contact path to reduce materially the deuterium content of said concentrated solution; injecting said solution of catalyst of reduced deuterium content into said liquid ammonia of low deuterium content entering said first path and injecting said synthesis gas into said first gas contact path at a point of similar deuterium concentration; condensing said evaporated liquid ammonia from said terminal portion of first path; flowing said condensed ammonia having a second body of an alkali metal amide catalyst dissolved therein along a second path in contact with synthesis gas comprising hydrogen gas containing deuterium capable of being transferred to said condensed ammonia in the presence of said second body of catalyst, whereby said condensed ammonia becomes further enriched in deuterium in a terminal portion of said second path; evaporating a portion of said condensed ammonia from said terminal portion of said second path to form a concentrated solution of said second body of catalyst in liquid ammonia further enriched in deuterium; flowing said last-mentioned concentrated solution in contact with synthesis gas comprising hydrogen gas of relatively low deuterium content from an initial portion of said second contact path to reduce materially the deuterium content of said last-mentioned concentrated solution; injecting said last-mentioned concentrated solution of reduced deuterium content into said condensed ammonia entering said second path and injecting said synthesis gas into said second gas contact path at a point of similar deuterium concentration, said hydrogen gas contacting the liquid ammonia in the first path being that which has contacted the condensed ammonia in the second path.

3. A process for enriching ammonia in deuterium, comprising flowing liquid ammonia of low deuterium content having a first body of an alkali metal amide catalyst dissolved therein along a first path in contact with synthesis gas comprising hydrogen gas containing deuterium capable of being transferred to said liquid ammonia in the presence of said catalyst, whereby the liquid ammonia becomes enriched in deuterium in a terminal portion of said first path; evaporating the liquid ammonia from said terminal portion of said first path to dry said catalyst and separate it from said ammonia enriched in deuterium; injecting said dry catalyst into said liquid ammonia of low deuterium content entering said first path; condensing said evaporated liquid ammonia from said terminal portion of first path; flowing said condensed ammonia having a second body of an alkali metal amide catalyst dissolved therein along a second path in contact with synthesis gas comprising hydrogen gas containing deuterium capable of being transferred to said condensed ammonia in the presence of said second body of catalyst, whereby said condensed liquid ammonia becomes further enriched in deuterium in a terminal portion of said second path; evaporating a portion of said condensed ammonia from said terminal portion of said second path to form a concentrated solution of said second body of catalyst in said condensed ammonia further enriched in deuterium; flowing said last-mentioned concentrated solution in contact with synthesis gas comprising hydrogen gas of relatively low deuterium content from an initial portion of said second contact path to reduce materially the deuterium content of said last mentioned concentrated solution; injecting said last-mentioned concentrated solution of said second body of catalyst of reduced deuterium content into said condensed ammonia entering said second path and injecting said synthesis gas into said second gas contact path at a point of similar deuterium concentration, said hydrogen gas contacting the liquid ammonia in the first path being that which has contacted the condensed ammonia in the second path.

References Cited by the Examiner

UNITED STATES PATENTS

| | | | |
|---|---|---|---|
| 2,453,837 | 11/1948 | Fisher et al. | 23—285 |
| 2,491,618 | 12/1949 | Luetzelschwab | 23—285 |
| 2,741,543 | 4/1956 | Urey | 23—204 |
| 2,787,526 | 4/1957 | Spevack | 23—204 |
| 2,889,205 | 6/1959 | Spedding et al. | 23—193 |
| 2,988,428 | 6/1961 | Hesky | 23—204 |

FOREIGN PATENTS

| | | |
|---|---|---|
| 225,603 | 11/1959 | Australia. |
| 807,803 | 1/1959 | Great Britain. |

OTHER REFERENCES

"Second United Nations Internation Conference on the Peaceful Uses of Atomic Energy," 1958, vol. 4, pages 516–519.

BENJAMIN HENKIN, *Primary Examiner.*

MAURICE A. BRINDISI, *Examiner.*

M. WEISSMAN, E. C. THOMAS, *Assistant Examiners.*